US007848949B1

(12) United States Patent
Delanders et al.

(10) Patent No.: US 7,848,949 B1
(45) Date of Patent: Dec. 7, 2010

(54) LEAD GENERATION BUILDING, OPTIMIZATION, MANAGEMENT, AND TRACKING TOOL

(75) Inventors: Jonathan Delanders, San Francisco, CA (US); Sara Schulte, San Francisco, CA (US)

(73) Assignee: Vinyl Interactive, LLC, San Francisco, CA (US)

( * ) Notice: Subject to any disclaimer, the term of this patent is extended or adjusted under 35 U.S.C. 154(b) by 759 days.

(21) Appl. No.: 11/843,578

(22) Filed: Aug. 22, 2007

Related U.S. Application Data

(60) Provisional application No. 60/823,096, filed on Aug. 22, 2006.

(51) Int. Cl.
*G06Q 40/00* (2006.01)
(52) U.S. Cl. ..................................... 705/14.49; 705/35
(58) Field of Classification Search .............. 705/14.49, 705/35
See application file for complete search history.

(56) References Cited

U.S. PATENT DOCUMENTS

2002/0188508 A1* 12/2002 Lee et al. ...................... 705/14
2005/0132267 A1* 6/2005 Aviv ........................ 715/500.1
2008/0052219 A1* 2/2008 Sandholm et al. ............. 705/37

* cited by examiner

*Primary Examiner*—Thu Thao Havan
(74) *Attorney, Agent, or Firm*—Law Office of Austin Bonderer; D. Austin Bonderer

(57) ABSTRACT

The present invention allows users to quickly develop web pages, or offers, to meet their advertisers' individual needs; mange the offers and inventory; and prioritize the order in which the offers are displayed. Functions included in the invention allow the user to internally monitor performance of marketing campaigns. The invention also has the ability to automatically prioritize which offers are to be displayed to users and in what order they will appear based upon the number of orders outstanding from an advertiser, the revenue generated from each conversion, the conversion rate of each offer, and a manual factor inserted based upon the business priority. The current invention allows the user to effectively and efficiently run a business where the user is required to set up offers for individual advertisers and maintain an effective balance of priority based upon business concerns, revenue, inventory of offer and conversion rates.

70 Claims, 21 Drawing Sheets

Fig. 3

Step 1: Create Offer

1. Duplicate the offer by clicking on link

2. Post Type will either be "HTTPGET" or "HTTPPOST"

3. Lead Type will either be:
   • RT (Real Time) ~90%
   • Batch
   • IFrame

4. Modify all other Offer Details based upon posting docs

Fig. 4

Step 2: Build Fields

1. Enter Field Names (Vinyl nomenclature – doesn't change)

2. Enter Question/Prompt based upon posting docs (what user sees as prompt on the form)

3. Modify order fields should appear in the form

4. Check "Required Order" if field is required

5. Check "Edit" to save changes to a field

| General | Fields | Mappings | Template | Validation |
| --- | --- | --- | --- | --- |

OFFER FIELDS FOR OFFER ID 96

Add Cover Fields
Edit List
name
 lastname
 address1
contact
 work_prefix
personal data
 dob
academics
 program
cashadvance
 lastpsycheck
reference
 ref1_firstname

| OFFER FIELD ID | FIELD NAME | QUESTION/PROMPT | GUI TYPE | FIELD DESC ID | DISP ORDER | REQUIRED ORDER | | | |
| --- | --- | --- | --- | --- | --- | --- | --- | --- | --- |
| 2617 | program | Program of Interest | pulldown | 111 | 1 | ☑ | Edit | Remove | View Options |
| 2618 | college_credits | How many credits have you previously... | pulldown | 1878 | 2 | ☑ | Edit | Remove | View Options |
| 2619 | firstname | First Name | textfield | 112 | 4 | ☑ | Edit | Remove | View Options |
| 2620 | lastname | Last Name | textfield | 113 | 5 | ☑ | Edit | Remove | View Options |
| 2621 | email | Email | textfield | 114 | 6 | ☑ | Edit | Remove | View Options |
| 2622 | address1 | Address | textfield | 115 | 7 | ☑ | Edit | Remove | View Options |

Step 4: Modify Offer Field Template

Fig. 6

1. If behavior of an offer field is not standard, modification may be needed on THAT OFFER'S field template 2. YOU MUST add the offerid to the global template URL 3. Modify template using HTML & JavaScript 4. For Geo target offers, "State" and "Zip" fields should not be visible. Enter an "a" in the Smarty Code box for each field to break the Smarty function and therefore not display the fields.

Step 5: Assign Field Mappings

Fig. 7

1. Select campaign associated with offer

2. Per the posting docs, map the advertisers field names to VI's field names in the format:
Adv. Field = %VI Field%

3. If offer is run on multiple campaigns, create a mapping for each campaign, changing only the Affiliate ID

| General | Fields | Mappings | Template | Validation |

Mapping Data - separate each mapping key by newline

Select campaign : -Default-

```
offer=67
affiliate=106
address=%address1%
city=%city%
country=%country%
dedicated=%survey1%
email=%email%
first_name=%firstname%
last_name=%lastname%
level_of_education=%edulevel%
opinion=%survey2%
phone=%home_areacode%-%home_prefix%-%home_suffix%
program=%program%
state=%state%
zip=%zipcode%
time_zone=%timezone%
work_phone=%work_areacode%-%work_prefix%-%work_suffix%
```

FIELDS
program
edulevel
firstname
lastname
address1
city
state
zipcode
country
email
home_areacode
home_prefix
home_suffix
work_areacode
work_prefix

Step 6: Modify Offer Template (if necessary)

Fig. 8

1. This action is rarely needed. Only modify if you need special behavior for the overall offer. *Examples: IFrames, some Kaplan offers*

2. For IFrame offers, use Smarty function to pre-pop field values from front (campaign) page 3. Modify template 4. ANY changes to this screen will overwrite EVERYTHING else about the offer

```
Tri-input pseudo-control

ASSIGN RAW HTML TO THE BOX. (THIS WILL OVERRIDE ANY OTHER FIELD SETTINGS.)
<script>
/**
 Tri-input pseudo-control
**/
function input3(parent /*name, value, length, defaults, style, class, onfocus, onblur*/)
{
    // Private class variables:
    if (isArray(parent))
    {
        this._parrary = parent;
        this._parent = parent[0];
    }
    else this._parent = parent;
    this._boxes = new Array(3);
    this._defaults = false;
    this._separator = " - ";
    this._container = document.createElement('div');

this._inherit_base_styles = false;
    this._inherit_parent_styles = false;

this._names  = new Array("field_1", "field_2", "field_3");
    this._styles = new Array("width: 25px;", "width: 25px;", "width: 32px;");
    this._lengths = new Array(3, 3, 4);
    this._values = new Array("", "", "");
    this._class = "text";

this._args = arguments;

// Constructor:
```

Tabs: General | Fields | Mappings | Template | Validators

Fig. 10

Step 8: Test & Launch

1. Enter testing URL (could be the same as the live one) is in the "Offer Posting URL" field 2. Send test lead to advertiser 3. Once accepted, modify "Success Code" field to match what the advertiser sends back to Vinyl on successful lead 4. Ensure "Offer Posting URL" is accurate for live leads

Fig. 14

Admin System: Inventory Management

Purpose: Interface for entering and managing offer inventory

ID# - School Name

Users will enter "offer inventory" for the month

Users can disable an offer by product (campaign)

Offers will "tech" disable automatically after 10 consecutive failures

1. Report by Advertiser

Layout of "Report by Advertiser" as generated today in the Access report:

*(table with Existing data fields: CPL, Daily Cap, Inventory, Leads To Date; Calculated fields: Leads Left (Act, Proj), Performance (ROI, Index) — SAMPLE DATA)*

- Existing Fields: The following column fields exist already and just need to be incorporated into the report:
    - CPL
    - Daily Cap
    - Inventory
    - Leads To Date

- Calculated Fields: The projections are calculated by subtracting leads generated from total leads for the month. However, daily caps need to be taken into consideration, as does performance.

| | |
|---|---|
| MC = Monthly cap | PM = Profit Margin |
| DC = daily cap | DR = days remaining |
| LG = Lead generated | I = Impressions (# of times page is viewed) |
| CPM = Cost per Impression | |

Act: Actual Inventory Remaining (AIR) = IF (DR*DC < MC − LG, DR*DC, else MC − LG)

Proj: Proj Inventory Remaining (PIR) = IF (I >0.85, AIR, else AIR*I)

ROI: (CPL*Leads to Date) / CPM * I

Index = Margin Index = PM for an offer / Avg PM for all offers

Fig. 15

2. Report by School

Layout of "Report by School" as generated today in the Access report:

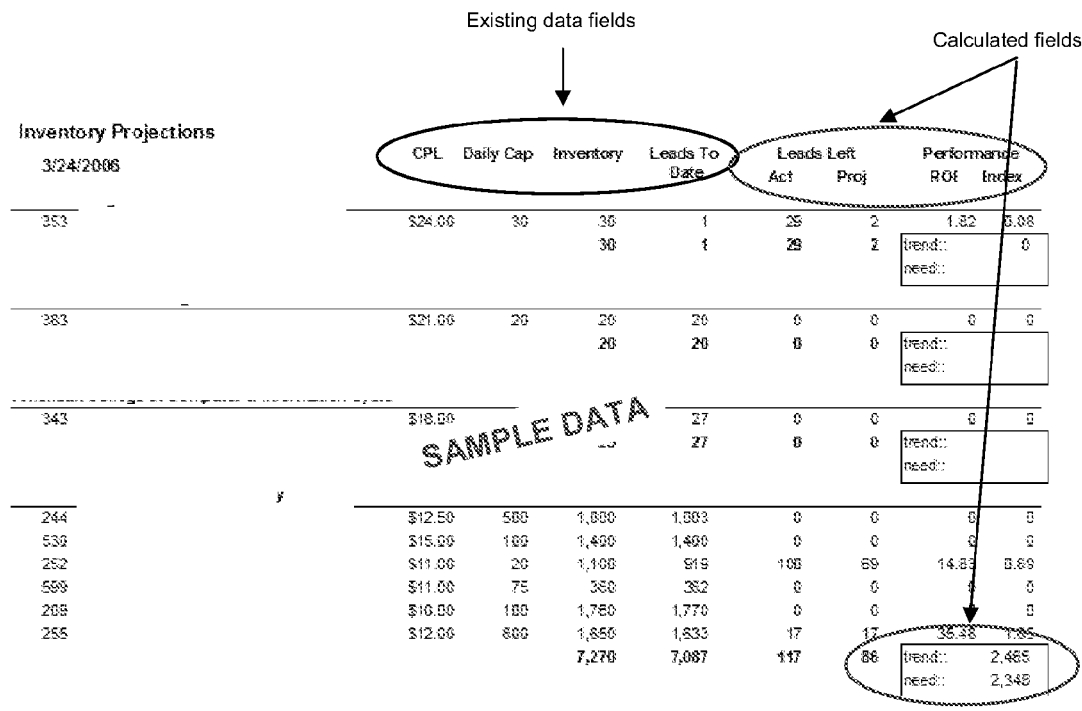

- Report by Advertiser Fields: All Existing Fields and Calculated Fields from Section 2.2.1 should be included in this report as well, using the same calculations.

- Additional Calculated Fields: Additional fields that need to be calculated are "Trend" and "Need" by school.

LG = Leads generated

DP = Days passed

TD = Total days in month

Trend: Inventory Trend = LG/DP * (TD-DP)

Needed: Project Inventory Needed (PIN) = IF( LG / DP*TD > PIR, LG / DP*TD, else 0)

Fig. 16

3. Report by Day

This report is intended to give the media buyers a by-day expectation of how much total inventory can be filled the remainder of the month. The numbers will change daily based upon how much inventory was filled the previous day.

Projected Inventory By Day
November 2005

12/19/2005

| Date | Value |
|------|------|
| 12/19 | 5,505 |
| 12/20 | 3,691 |
| 12/21 | 3,035 |
| 12/22 | 2,479 |
| 12/23 | 1,954 |
| 12/24 | 1,625 |
| 12/25 | 1,026 |
| 12/26 | 884 |
| 12/27 | 728 |
| 12/28 | 634 |
| 12/29 | 567 |
| 12/30 | 484 |
| 12/31 | 484 |
| Total | 23,100 |

- Calculations:

DC = Daily Cap

Index = PM for an offer / Avg PM for all offers

PIR = Proj Inventory Remaining = IF (I >0.85, AIR, else AIR*I)

For each remaining day in the month, calculate the total projected Inventory that will be filled all offers in a given campaign.

Day X Inventory Projection:

For Indexes >= 0.85: $\Sigma$ IF (PIR>DC, DC, PIR)

For Indexes < 0.85: $\Sigma$ IF (PIR>(DC*I), DC*I, PIR)

Fig. 17

Admin System: Inventory Projections

Purpose: Provides projections for the month on how much Inventory we expect to fill (based upon performance to date)

Fig. 21

Web Property: Customer Lead Form

Purpose: These are images of one of our customer web sites, demonstrating how the rotation priority affects the offer order from a user perspective.

First Offer

Second Offer

*and so on...*

LEAD GENERATION BUILDING, OPTIMIZATION, MANAGEMENT, AND TRACKING TOOL

RELATED APPLICATIONS

This application claims benefit of the filing date of U.S. Provisional Application No. 60/823,096, filed Aug. 22, 2006, the disclosure of which is incorporated herein by reference.

FIELD OF THE INVENTION

The instant invention relates to systems and methods for presenting offers to end users, managing inventory of the offers and maximizing profit.

BACKGROUND OF THE INVENTION

The purpose of the Internet, in terms of business, is to match consumers with products. The Internet has created an easy to access worldwide market. This market has invited many different types of merchants trying to connect with their particular consumers. However, the size and attractiveness of the market has created a very crowded cyberspace. This crowdedness has created the need for merchants to advertise or find other ways to match their product with consumers. Specialty websites, such as Amazon®, fulfill the need. Merchants will contract with these sites to either collect orders, obtain information or direct traffic to their sites. These specialty sites will have relationships with multiple merchants, and each merchant will have their own particular needs. Therefore, there is a need for an efficient system to build individualized pages for multiple merchants, manage inventory and determine the order in which those pages are displayed to the end user.

In the business of online marketing, it is necessary to efficiently create individualized web pages and to track performance of marketing campaigns with very "broken down" data to maximize business profits. There are very few tracking software applications designed for web-based business lead generation and information gathering, and the ones that are available do not meet the requirements of today's industry.

Currently, no software or system is available that allows a user to create and manage multiple offers; edit, manage, project inventory; and/or prioritize the displaying of these offers based upon several factors such as business need, income, conversion and inventory. The current packages available do not meet the needs of today's business. The main function of these packages is to handle reporting and tracking. Basically they count clicks and leads for websites. These programs have a "pixel-based" structure, meaning that one would place an invisible line of code (a pixel) on each of their web pages on ones site. Each time the page would load, the pixel would fire. This is how counts of clicks and leads occur in the current software available. There is no concept of inventory or offer priority in the available systems.

SUMMARY OF THE INVENTION

The present invention cures the deficiency of the present state of the art by allowing the user to quickly develop web pages, or offers, to meet their advertisers' individual needs; mange those offers and inventory; and prioritize the order in which the offers are displayed. Functions included in the invention allow the user to internally monitor performance of marketing campaigns; project whether they need to increase the business priority of certain advertisers to fulfill the requested lead generation; or need to contact the advertiser because of a projected ability to fulfill more lead generations than originally ordered. The invention also has the ability to automatically prioritize which advertiser's offers are to be displayed to users and in what order they will appear. The reprioritization is automatically determined by several factors. These factors include automatically calculated fields based upon the number of orders outstanding from an advertiser, the revenue generated from each conversion and the conversion rate of each offer. There can also be a manual factor inserted based upon the business priority as determined by the user. The current invention allows the user to effectively and efficiently run a business where the user is required to set up offers for individual advertisers, show those offers to possible customers and maintain an effective balance of priority based upon business concerns, revenue, inventory of offer and conversion rates.

While this description is geared to a web-based business, the adaptation can be made to traditional brick and mortar, financial institutions, insurance and any other business where one would have multiple products competing for the same consumers is contemplated.

BRIEF DESCRIPTION OF THE DRAWINGS

FIGS. 1-21 are schematics of the various aspects of the instant invention;

FIGS. 1 and 2 detail an overview of the build offer process according to the present invention;

FIGS. 3-10 show an embodiment of the offer build process in the form of a graphical user interface as employed by the user of the invention;

FIG. 11 shows a flow diagram of an embodiment of the invention in line with a incentive based campaign;

FIG. 12 shows a flow diagram of an embodiment of the invention in line with a non-incentive based campaign;

FIG. 13 shows a flow diagram of an embodiment of the invention in line with a incentive based campaign with offers from a variety of sources;

FIG. 14 shows screen shots for a graphical user interface for entering and managing of inventory by a user according to an embodiment of the inventory management system of the instant invention;

FIGS. 15-18 show annotated screen shots of reports and formulas used by an embodiment of the inventory projection system of the invention;

FIG. 19 shows screen shots for a graphical user interface for entering and managing of information by a user according to an embodiment of auto-priority system of the instant invention;

FIG. 20 shows an annotated screen shot of a report produced by an embodiment of the auto-priority system of the instant invention with information of the offer display order; and FIG. 21 shows a sample of the end user interface according to an embodiment of the instant invention.

DETAILED DESCRIPTION

When describing this invention it is necessary to become acquainted with terminology employed in the description and the figures. These definitions are used to describe the example and are in no way meant to limit the scope of the invention.

Advertiser is used to describe an entity that is a client of the user. This includes schools and brokers who represent schools.

School is a subclass of advertiser. In the example shown in this disclosure, a school is a direct client of the user, without a broker.

Offer is used to describe a lead generation form that is built for individual advertisers. The offer may have fields required by that advertiser in order to obtain information from outside users. It can also just display a product. While the offer is described in the example below as a lead generation form, it can be used in any environment where unique interfaces must be created and information obtained from the end users.

Inventory is used to describe the number of outstanding orders for an offer.

Offer Build and Management Administrative System

The first aspect of the invention is the way in which an offer is developed for each advertiser and how the offers are managed. Although each offer is unique, they share many common elements. It provides a business advantage to build these offers and set them "live" as quickly as possible. The need to fulfill these two requirements, in addition to the ability to create a large volume of individualized offers, requires a streamlined process and template tool for generating new offers.

This facet of the invention comprises of a process and administrative system interface to quickly build and update offers. Without this build template inside the administrative system, one would have to write source code for each new offer built. Instead, all requirements common to the majority of offers are entered into the global template, and the offer is generated by the system. Thus a change in the global template will alter all of the offers built with the global template. By way of an example, the system will be described in an application where lead generation for multiple different educational institutions is the product. The steps of creating an offer are shown in FIGS. 1-10.

Figure 1:
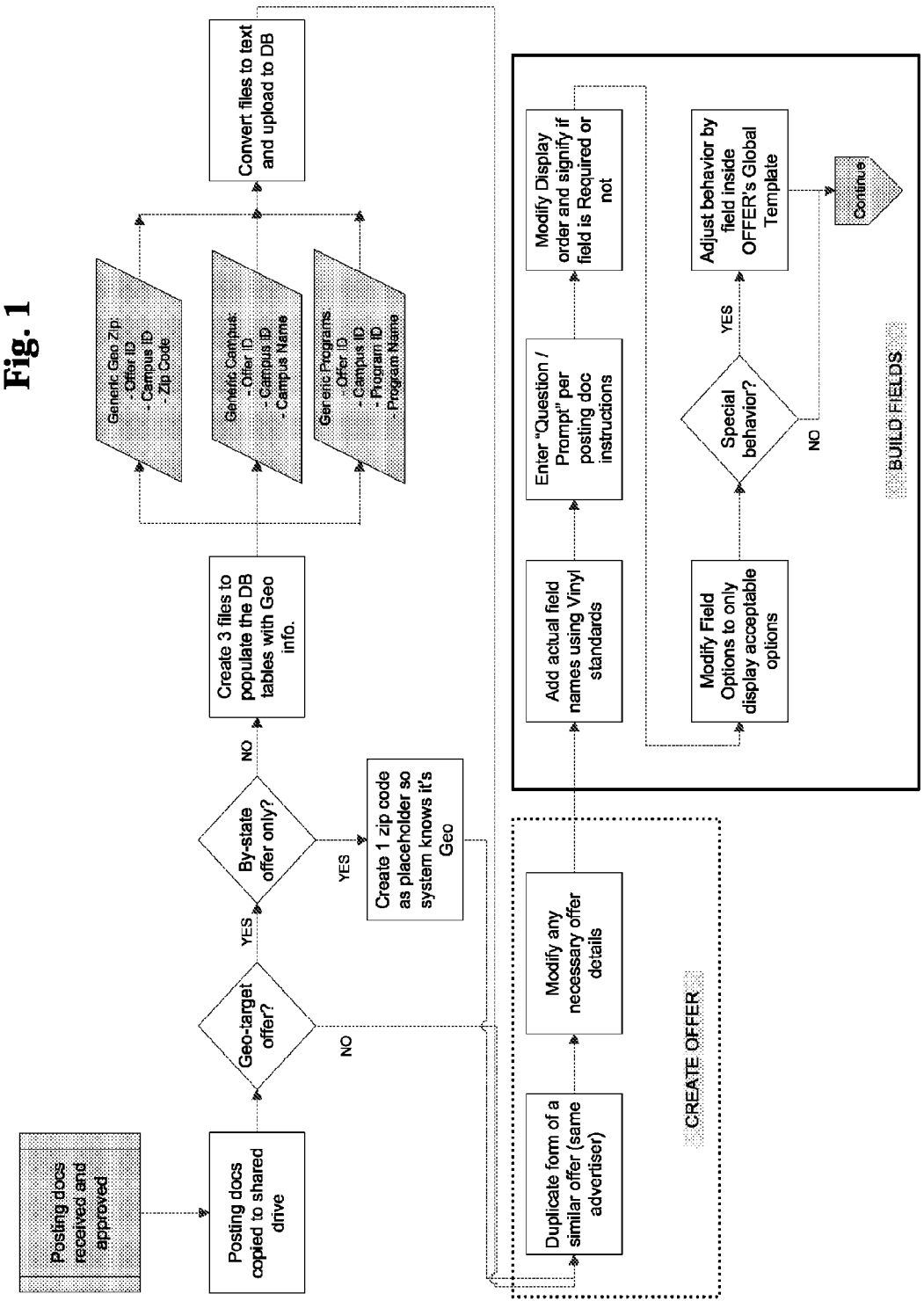
Figure 2:
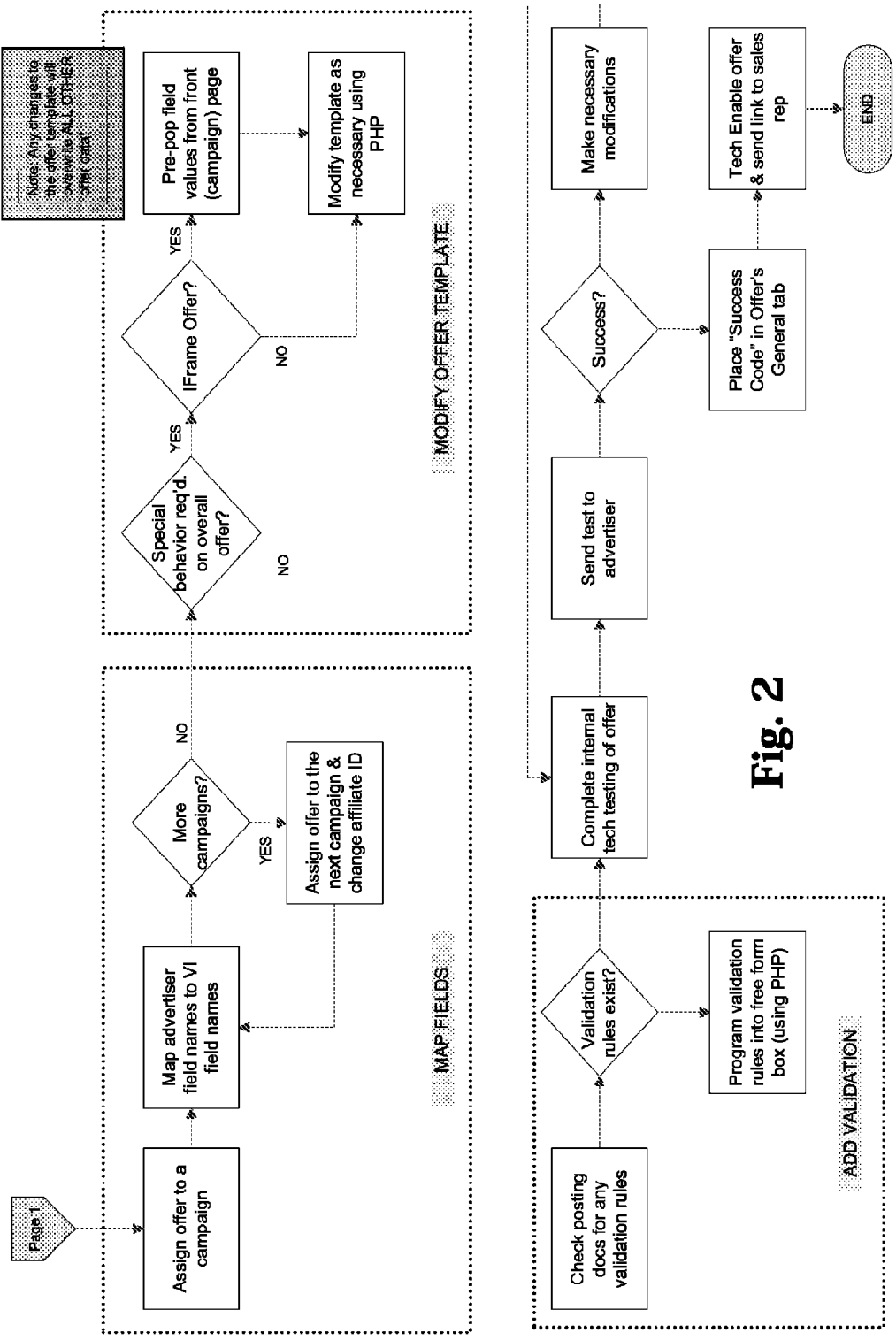

FIGS. 1 and 2 disclose a flow chart of how the offer is built. First, the information for the offer is obtained by the user. The invention then allows for the advertiser to place geographical constraints on some or all of the inventory. In the example shown, this could be required for programs that are not offered online, such as traditional brick and mortar institutions. This will prevent the situation where the offer is shown to a prospective student who lives across the country and is less likely to take advantage of the offer. In the example, the database tables contain the geographic data for the offer. An offer can be geo-targeted at the campus level or program level (i.e. certain programs within a school are only available in certain geographic locations). This also allows the advertiser another way to target a specific market. If there is a geographic constraint, the user will account for that and move forward in the offer build process.

The user can either create an offer from scratch, inserting all of the data and fields from the global template that are required, or if reasonable, duplicate an offer that has similar fields and modify the offer details. This duplicate function also allows the user to quickly process the offer if there is more than one offer from a single advertiser. Again, all the user needs to do is modify the fields and/or the offer details, shown by example in FIG. 3. Also, if there are multiple offers from a single advertiser, the user can assign a specific identification (ID) to that advertiser which will enable the user to pull up all of the offers associated with that advertiser.

After the details of the offer are entered, the user will add the required fields to the offer. The fields are determined by what information the advertiser requires from the end user to be considered a successful conversion. The user can also determine what fields are required from the end user in order for the end user to successfully submit the information. If the end user did not enter the proper information in the required fields, the user would get a failure notice and be asked to fill in the fields. The user can also enable the offer to show the end user the acceptable answers, such as a drop down menu. To make offer build process work efficiently as possible, common fields within the offers are identified (i.e. "First Name", "Last Name", "Address", etc.) and are incorporated into a global template. The user is able to add fields to the global template as needed.

If the advertiser requires information that is outside the fields within the global template, the invention allows the user to adjust the behavior of the offer and tailor the offer to meet the advertiser's specific needs.

FIG. 2 shows the continuation of the process from FIG. 1. After building the fields, the user will then map the fields to the advertiser's-specific field names. The invention also allows the user to have many different types of campaigns. With the current example, the user may assign the offer to campaigns associated with free scholarships, obtaining a degree, an incentivized site, or any combination thereof.

At times, a special behavior is required for the offer. In that case, the user can either use Iframes or modify the offer using an appropriate editor. Iframes are used when the advertiser "hosts" the offer code and the user merely "frames" it inside a campaign web site. When modifying the offer template, it may or may not overwrite all other offer data. However, as anyone can see, if the actions/fields required become very common, they can be added to the template.

Sometimes validation rules are required. In that case, the user is able to insert the validation rules into the offer.

There are times when the advertiser wants their specific images to be displayed with the offer. The user is able to associate these images with the specific offer.

After building the offer, testing is performed. Dummy information is used, and the dummy information is then transferred to the advertiser. The advertiser then checks to see if the information and the format of the data meet their requirements. If the advertiser is satisfied, the offer is made live, if not, the necessary modifications are performed.

FIGS. 3-10 show slides of the user interface of the offer build system.

FIG. 3 shows some possible information that can be inserted into an offer. It also shows that the user can create different offers for a single advertiser. In the case of multiple offers from a single advertiser, there is an ID associated with that advertiser.

FIG. 4 shows that the user will add or remove fields to the offer as required by the advertiser's specification. There is also a way for the user to make a field required and determine the order in which the fields appear on the offer. Every offer can have an ID associated with it so that it can be identified within the system, but several offers may originate from the same advertiser, having the same advertiser ID. It is also contemplated that there may be two or more different IDs. As an example of two IDs, one could indicate the offer, and the other would be specific to the offer's advertiser (school or broker).

Figure 5:
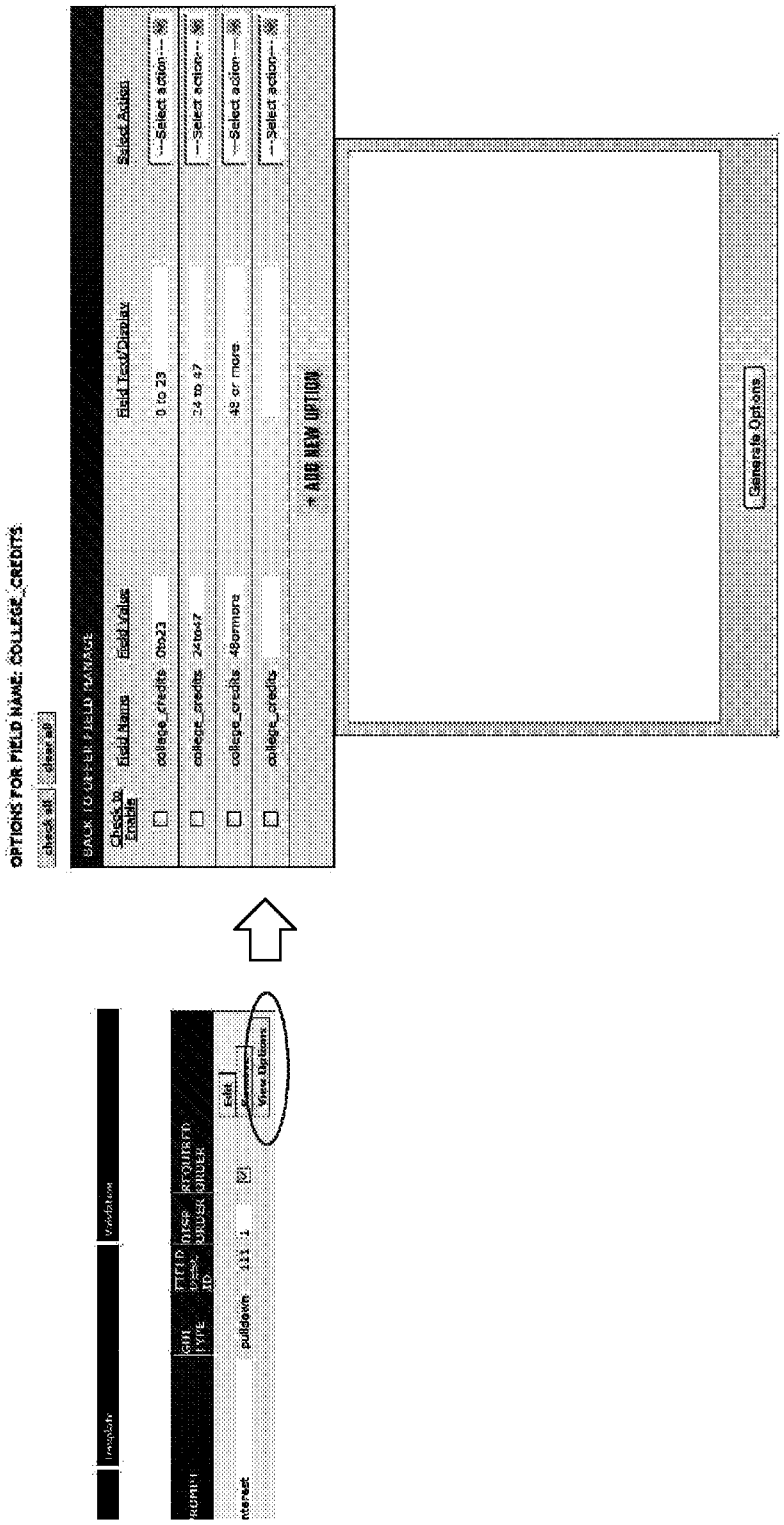

FIG. 5 shows how the user can create drop down menus for the fields in the offers. The drop down menus requires that the end user select pre-specified answer. This limits the possibility of answers and better helps to classify the end user.

FIG. 6 shows that if the advertiser's needs are not met by the items supplied in the template, the user is still able to modify the offer field template by using an acceptable editor and code language. The template is not limited to fields. It can contain common code used by all offers. Most common offer features can also be disabled through this interface with the use of simple programming commands written in Smarty, a PHP template language. FIG. 7 shows that if the advertiser wants to accept the information directly into their database, the user can obtain the advertiser's field names and map those names to the user's field names. This allows the user to directly push the information collected the advertiser's database without much delay and in the format they desire. The information supplied to the advertiser can either be instantaneous, hourly, weekly or any other time frame the advertiser requests.

FIG. 8 shows that the user is able to incorporate the use of Iframes/frames if they are required. The user will use the smarty function to pre-pop field values from the front offer of the user's site.

Figure 9:
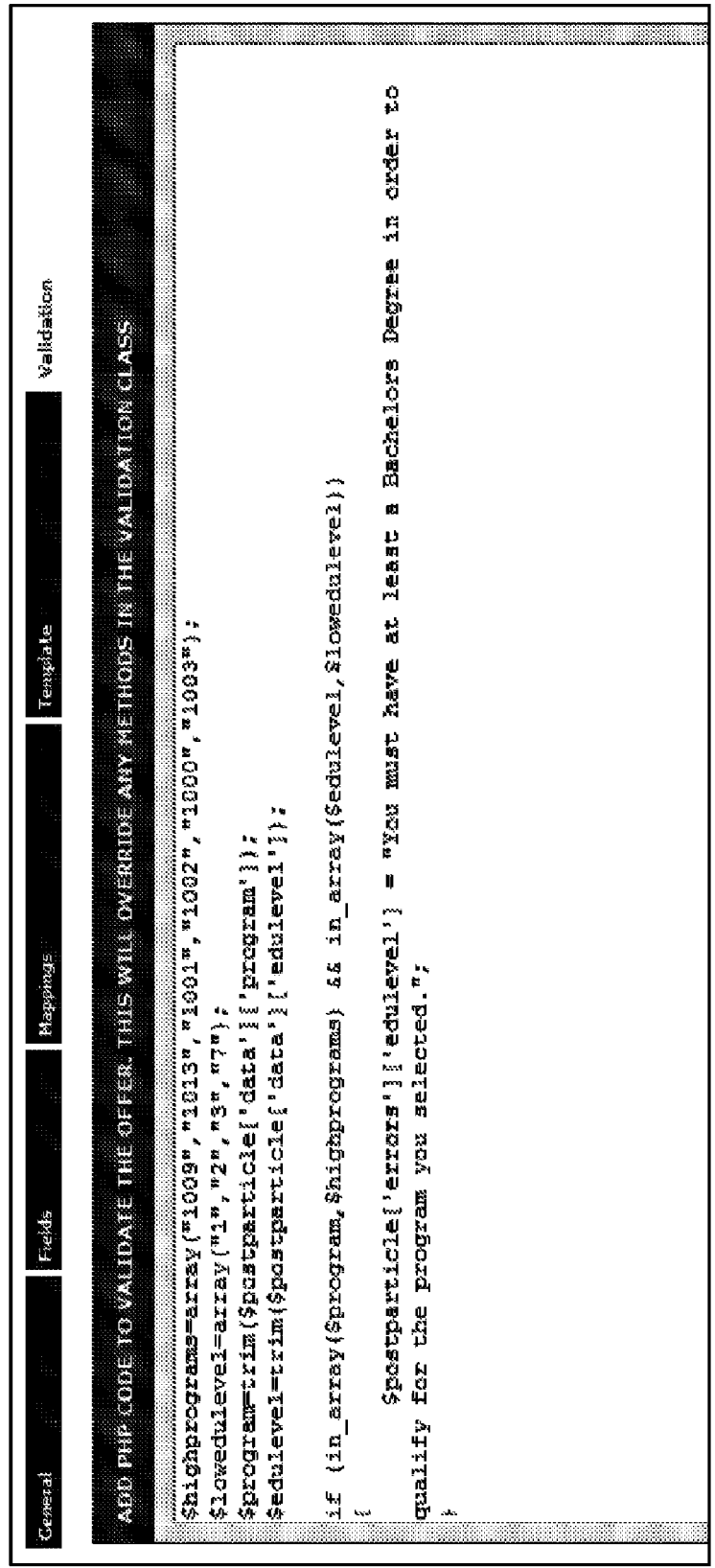

FIG. 9 shows that if the advertiser's needs do not allow certain field combinations in the offer, validation rules can be associated with that advertiser's offer. This will prevent the submission of a lead unless the end user's selections pass validation.

Once the offer is built or made live, the user can use the system to edit the offer at any time. The system may have secured login system so that users can access and edit the information anywhere they are able to access the Internet.

Inventory Management & Projections

Once the offers are built and saved, the user must have a way to manage all of the offers and inventory. The user could have several campaigns running at the same time, with hundreds of offers associated with each campaign. Offers can be associated with one or more campaigns. The user may also have to re-establish inventory and pricing for each offer that will be running during certain time period. It is necessary to have a system and a user interface for managing the offers and their inventory. Additionally, to maintain client relationships, maximize profit and ensure future inventory, it is important that the user utilize as much of the allocated inventory as possible during an allotted time period. In order for the user to have continuous insight into whether an offer will utilize its inventory or not, the system has internal projection calculations that provide the user with a metric to determine the likelihood an offer's inventory will be utilized or not within the allotted time period.

Once an offer has been built, the user can go into the inventory system to add inventory for that offer. In the example disclosed, inventory is set on a monthly basis, and the process has to be repeated each month. However, the user can determine any time period in which to use as their basis. The user will enter the critical information manually, such as the price point, daily and/or monthly caps, and which of the user's campaigns the offer is associated.

The administrative system will then electronically update any changes in inventory indicating what has been used, needs to be used, and income generated from the used inventory, once an action has taken place. Additionally, the interface provides for a "one-click" method for disabling an offer instantly, if for some reason there is a need to stop displaying a specific offer. If a certain offer receives certain number of rejections (when the information is submitted to the advertisers and a failure occurs), then that offer will become automatically disabled until the issue has been resolved. As per the example, the instance of 10 failures in a row is the triggering event. The user could very easily define other parameters for the system to automatically disable the offer. The parameters can be based upon certain failures in a row and/or a percentage rate. The parameter is easily determined by the user.

The system is also able to provide a cap for the amount of inventory used within a certain geographic location. Thus when a predetermined number of offers are converted by end users of a certain geographic location, the offer will be excluded from being displayed to end users within that geographic location. However the offer will still be presented to others outside that geographic location. Also, there may be instances where there is a national association or a franchise chain, if more than a predetermined number of offers are associated with a branch are being used, the offer will be turned off for that branch, yet still be offered for end users not be associated with that branch. In line with the example, there are yet other times where there is a national type university that has branch locations or specific areas where they target end users. The system will place caps on the amount of people meeting certain criteria, prevent the offer from being displayed to other end users meeting that criteria for a period of time, but yet allow the same offer to be presented to end users who do not meet that criteria. There can also be a cap on number of conversions originating from a specific third party.

Figure 11:
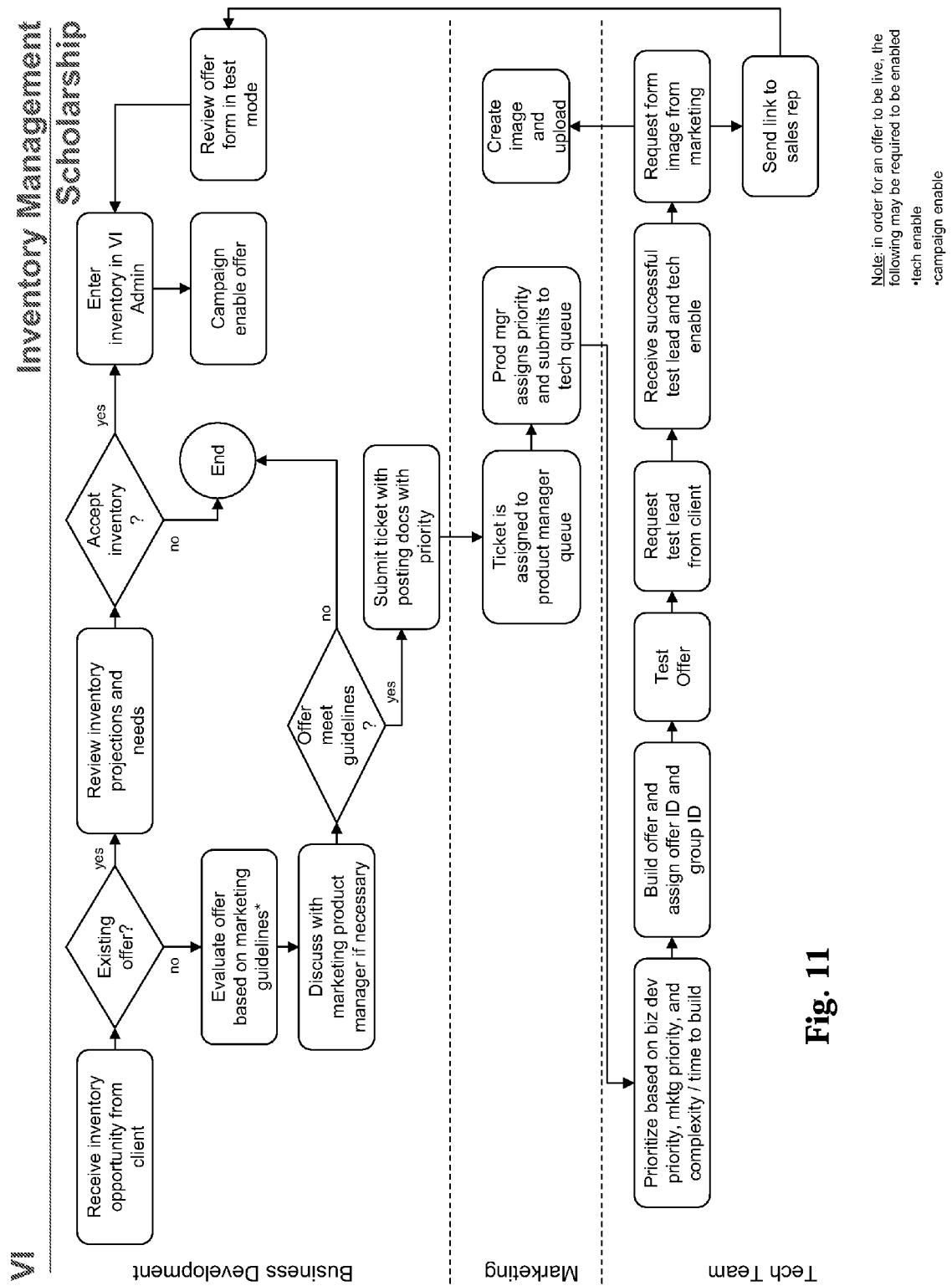
Figure 12:
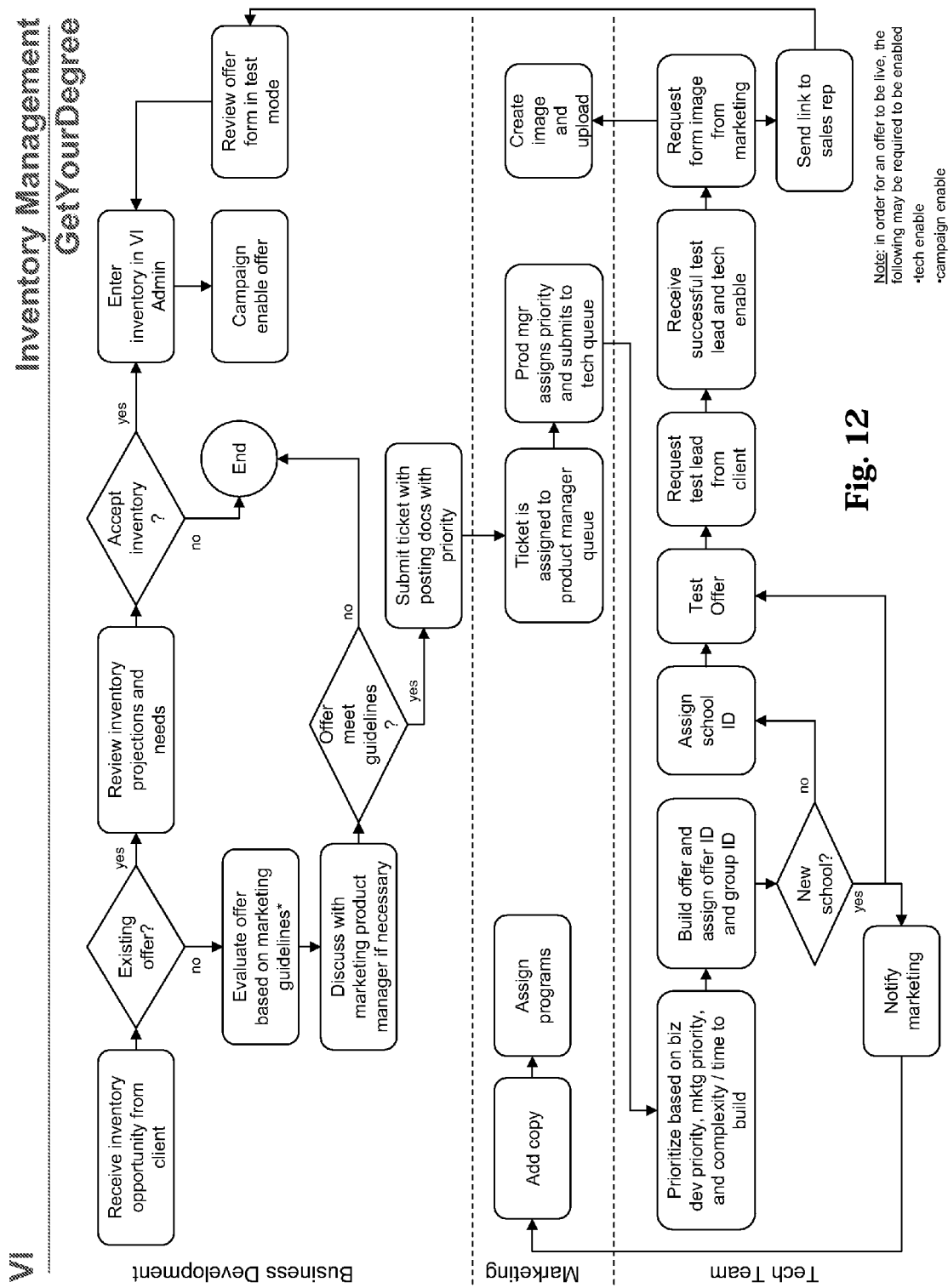
Figure 13:
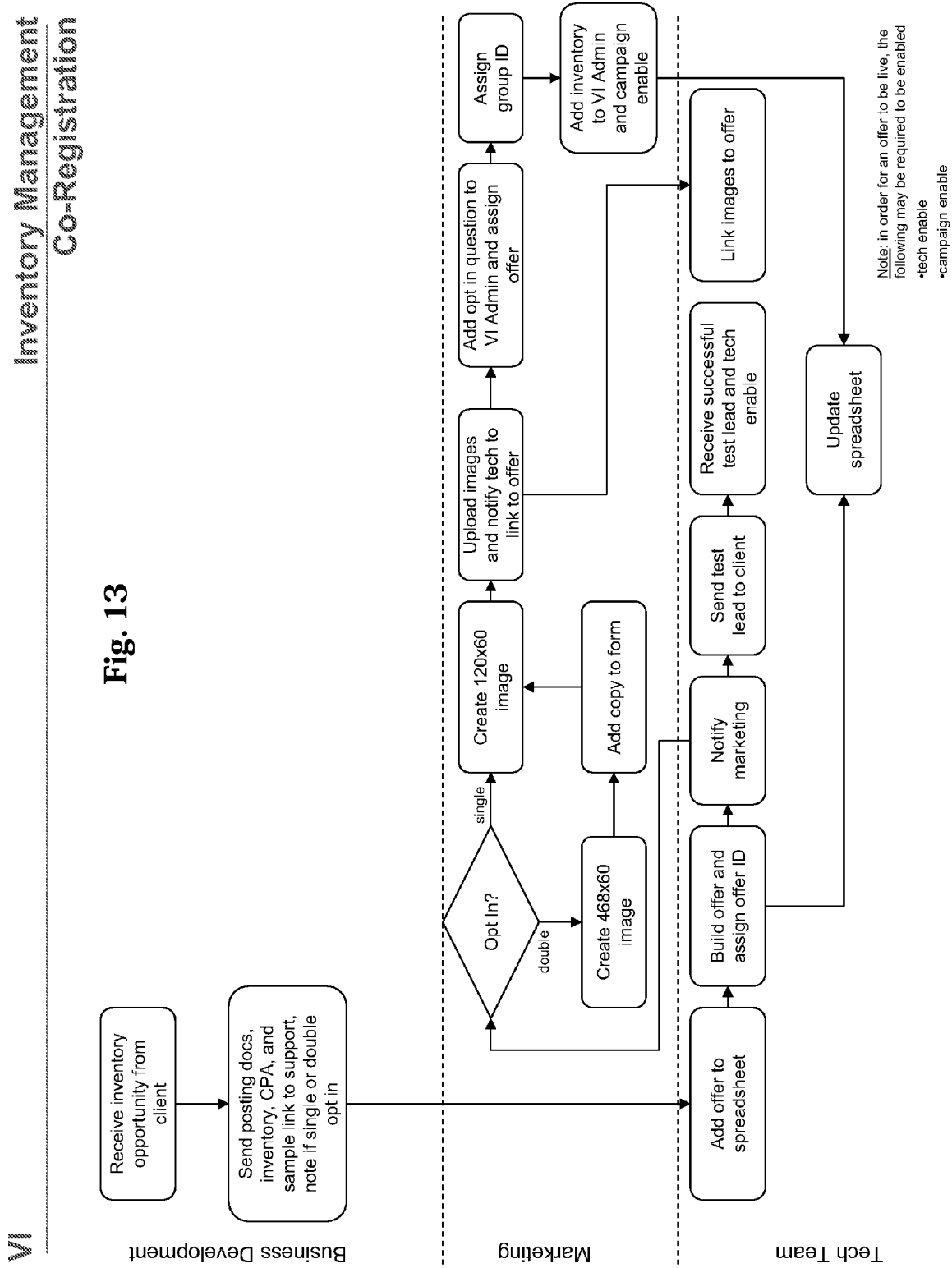

As per the example disclosed in FIGS. 11-13, three campaigns are shown. In FIG. 11, the process associated with a campaign designed to match prospective students with scholarships is disclosed.

First, the user will receive an allotment of inventory from an advertiser. If the request comes for a new offer, the user would determine if it is appropriate to accept the request. The user may consider marketing factors and the users own guidelines before accepting the request. The user would then use the offer build system discussed above to create the offer, insert the inventory (same as with an existing offer), and make the offer live. The user is not restricted to a first come, first build process. The user, using their judgment based upon factors such as business development, marketing priorities, and complexity/time to build the offer, can determine what offers have priority, and what offers are built first.

If the inventory request is for an existing offer, the user will then review inventory projections and needs (discussed below) to determine whether or not to accept that offer. If the user accepts, the user will then enter the inventory into the inventory management system. Once the inventory management system is updated, all functions that employ inventory as a factor will be automatically updated. Therefore, the entire system will work based upon the new inventory allotted for that specific offer.

FIG. 12 shows a Get Your Degree campaign. In this example, the campaign is designed to match prospective students with schools. This campaign varies from the scholarship campaign in that it does not offer the end user an incentive (i.e. a chance to win a scholarship) for viewing the offers. As mentioned above, the invention allows the user to associate many different offers with the same advertiser by assigning an ID with that advertiser, such as a number.

FIG. 13 shows a third campaign called co-registration. This site is an example of another incentivized site that contains offers from a variety of sources. The end user has to successfully view and/or fill out a predetermined number of offers before being eligible for the incentive.

It is clear that any campaign can be created using the invention that places customers in contact with potential clients. As another example, the user could very easily use the invention in the financial and insurance business. The user could set up offers for different financial instruments from multiple financial carriers. These offers could be accessed by the financial or insurance institutions' agents, independent agents (who get commissions for selling products) or the end user themselves. The user could also be an independent brokerage and set up the system to maximize profits (commissions) by using the invention to create and manage the offers, as well as determine the priority in which their employees access the offers to sale to the public.

FIG. 14 shows a sample user interface for entering and managing an offer's inventory. In this example, the inventory management system allows the user to input a months worth of inventory, shown as leads. The inventory management system also allows for the user to indicate the start date and the campaign the offer is associated with. The system also allows the user to define a daily cap for the offer. Sometimes it is beneficial for the advertiser to space out the leads they receive so they can send a steady flow of leads directly to the schools and schools can better manage contacting perspective students. The user is also able to insert comments about the offer for future reference. The user interface will also display the history of the offer for which the user is updating the inventory.

The user may also provide a secure interface so that the advertisers can update their inventory on their own.

FIG. 14 also shows an inventory sheet displaying the current inventory for all active offers. The user is able to create a detailed report that is filtered for the specific information by present or past months, what advertisers, which user is assigned to the offer, and what campaign is associated with the offer. The sheet is user friendly in that it enables the user to determine what categories are shown in the sheet. It also allows the user to arrange the sheet by the values in each of the categories. Categories can include, but are not limit to: offer ID; advertiser code; advertiser name; offer name; campaign name; earnings per lead; inventory for the month; leads generated; daily cap; leads today; income generated; inventory left; offer type; and geographically limited offers. The user is able to determine what categories are relevant to their specific needs and produce a sheet accordingly. The user is free to create new categories to match their particular needs.

It is necessary to have a good understanding into how inventory is performing during the allotted time period, and project the likelihood of filling inventory commitments made to advertisers. Therefore, a projection must be made to determine if the entire inventory is going to be used. This projection is not a straight-line calculation because offer priority can change so frequently.

The user can break down the trends by producing reports based upon certain criteria. FIGS. 15-17, show reports based on advertiser, school and day. Theses figures use the example of a lead generation system for matching prospective students with schools to demonstrate how the invention works. FIG. 15 shows a report based upon brokers, who can represent individual schools (called advertisers in the figure). The figure shows that there are several fields that are present in existing data fields and are incorporated into the report. These fields are Cost Per Lead (CPL), Daily Cap (DC), Inventory, and Leads to Date. The report then uses these fields to calculate leads left (remaining inventory) and performance. The leads left are broken down to Actual Inventory Remaining (AIR) and Projected Inventory Remaining (PIR).

$$AIR = IF (DR*DC < MC - LG, DR*DC, else MC - LG)$$
$$PIR = IF (I > 0.85, AIR, else AIR*I)$$
Wherein
I = Index          MC = Monthly cap
PM = Profit Margin  DC = Daily Cap
DR = Days Remaining   LG = Lead Generated
CPM = Cost Per Impression
(Impressions = the number of times page is viewed)

The performance factors are Return on Investment (ROI) and Margin Index (Index).

$$ROI=(CPL*Leads\ To\ Date)/Total\ CPM$$

$$Index=PM\ for\ an\ offer/Average\ PM\ for\ all\ offers$$

FIG. 16 shows a report by school. Again, the same fields are used. However, two additional projection fields are shown. These fields are Trend and Need. Trend represents inventory trend, how much inventory is expected to be used by the end of the allotted time period. Here that time period is a month. Need represents projected inventory needed, the amount of inventory that could be used over the remaining inventory for the rest of the month. This allows the user to identify those offers where they either need to approach the advertisers and ask for more inventory or adjust the offer to make it perform better. While Trend and Need are not shown in FIG. 15, it is possible to have those calculations on that report or any report.

The Trend and Need are calculated using the following:

$$Trend = LG/DP * (TD-DP)$$
$$Need (PIN) = IF( LG/DP*TD > PIR, LG/DP*TD, else\ 0)$$
Wherein:
LG = Leads Generated   DP = Days Passed
TD = Total Days in Month   PIR = Projected Inventory Remaining FIG. 17 shows a report by day. The user is able to use this report to show how much inventory is projected to be remaining for each day left in the month. This report is very useful and is updated continuously or at a predetermined interval, such as a day. The user may choose to employ publishers, such as a search engine, to help attract end users. In such an instance, the publishers may get a certain amount for each lead that comes from their directing traffic to the site or on a per visit basis. As in this example, the user grants a publishers' media buyers access to the daily reports so that they can determine how much traffic they want to direct to the site.

The inventory projection is determined in the following way:

Inventory Projection=

For Offers with Indexes>=0.85:ΣIF(PIR>DC, DC, else PIR)

For Offers with Indexes<0.85:ΣIF(PIR>(DC*$I$), DC*$I$, else PIR)

Figure 18:
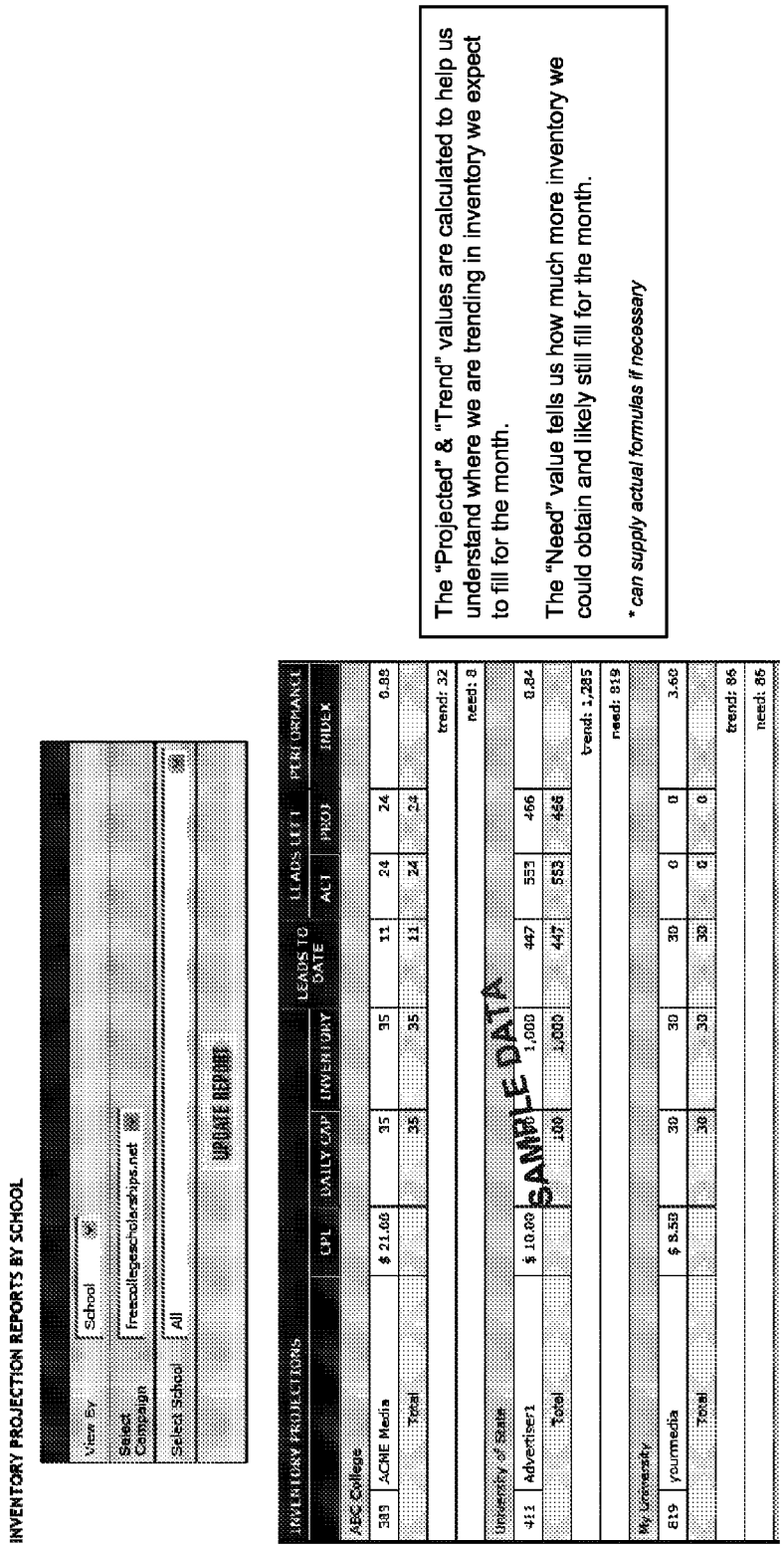

FIG. 18 shows a user interface for compiling the reports and viewing the Trend and Need values.

Auto-Priority System

Figure 19:
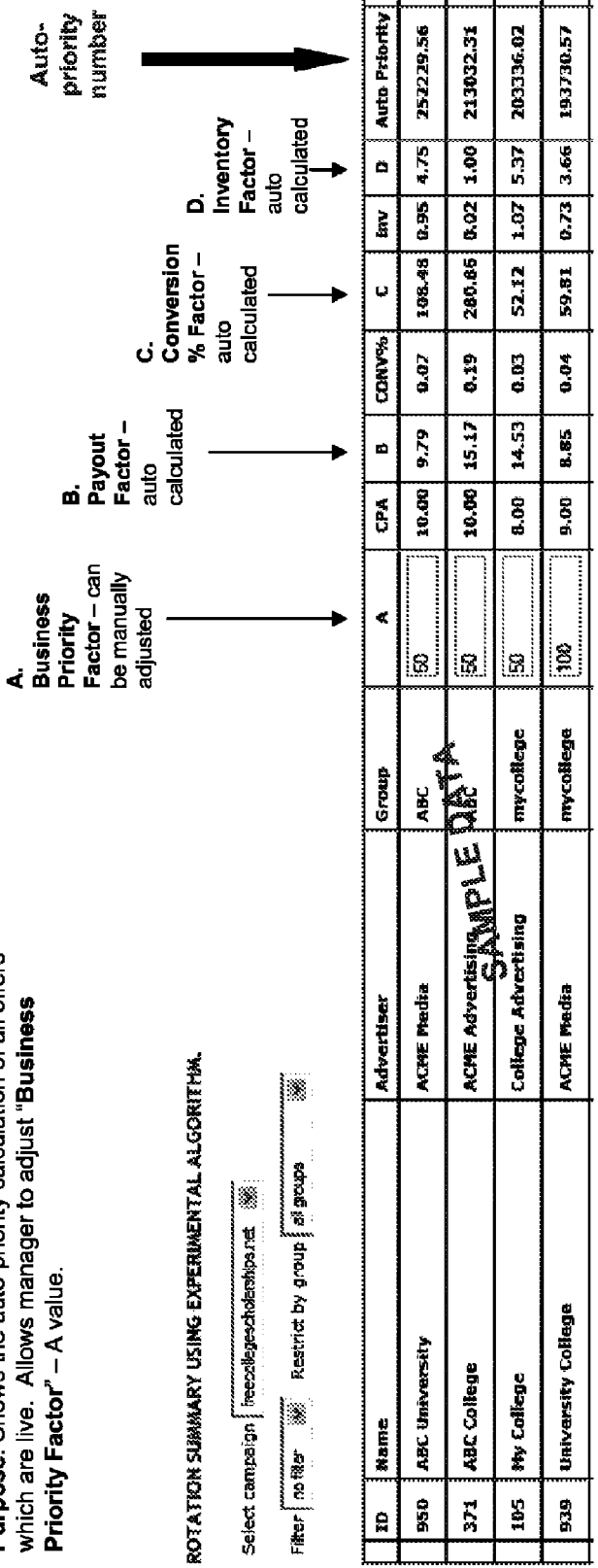
Figure 20:
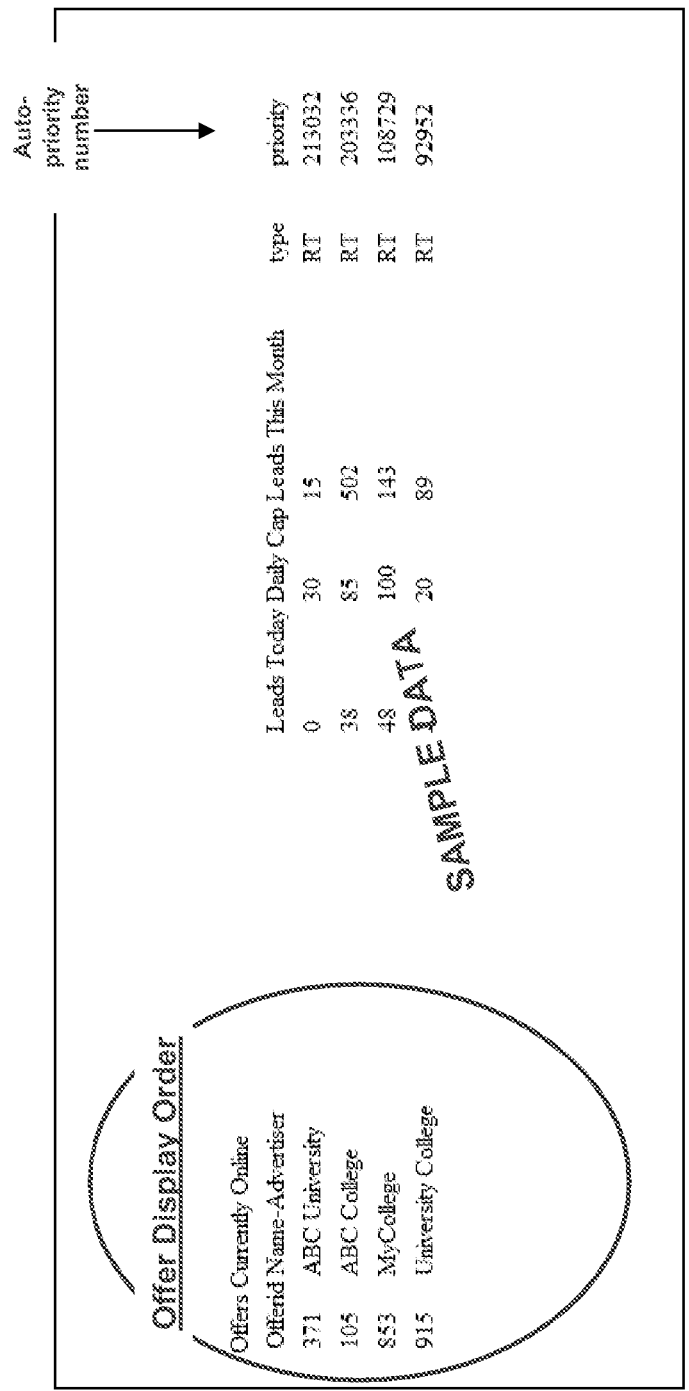

FIGS. 19-21 are from an example of the system used in an online environment. In this example, end users come to the landing page of a campaign web site and input some initial data, such as their name and zip code, and submit that information. The system will then display the offers one at a time as not to overwhelm the end user and to point them in a desired direction. However, the priority system can be used to display multiple offers within a single page. The priority system can be configured and used to determine what offers are shown and in what order.

The system may also take into account the end users location for use with geographical limited offers. The system may also retain the information that the end user has submitted from any point within the site and import that information into the appropriate fields within the same or other campaigns. This is done in an effort to help the end user complete the offers as quickly as possible.

Analysis has shown that end users, on average, will complete two to three offers per visit to a campaign web site. Therefore, it is important to show the "best" offers first in the rotation. The "best" offer to the user is one that maximizes earnings, and that can be influenced by several factors.

The auto-priority system determines in what order the offers will be displayed to the end user. There are many ways mechanically to do this. One way of presenting the offers to the end user is to have a predetermined order of pages within the site. The pages content will vary based upon the auto priority system. The end user will access the landing page (the first page on the site) and then input some basic information, including geographical information. The system will determine what offers are to be moved to what pages within the site (page 1, 2, 3 and so on) until all of the active offers for that end user are placed on a page. Therefore, the end users will then move along the set path of pages, but the content of those pages, the offers, will be determined by the auto-priority system. The number of pages shown will be limited to the number of offers available to that end user. This is the way in which the offers are displayed in the example.

After the end user has been presented the last offer, the user will can be sent to the next page that contains exit information (such as a "thank you come again" or "we will be in touch"). This exit page can be created like an offer in the auto-priority system, but will always have the lowest priority. Alternatively, it can be a permanent page to which the user is directed.

In order to maximize profit and maintain customer/advertiser satisfaction, a system of prioritizing what order the offers are displayed to an end users is desired. The invention has a system that can be employed. This system, based upon several factors, automatically determines the appropriate priority factor each offer. Once the priority factor is determined, the order in which the offers are displayed is arranged accordingly. The user is able to determine how often the auto-priority system will run. The user may find that a continuous calculation is appropriate or set it to some other frequency. One available option is to employ a "decision-engine" environment, where the auto-priority system runs in real-time and will create an order that is specific to that end user. In a "decision-engine" environment, the user will determine what information is required to determine that end user's order of offers. The order can be determined after submitting information to the landing page, or change in response to answers to the offers presented. The system is flexible and allows the user to determine what works best for their given situation. The user is then able to manage vast number of orders and maximize profit.

In determining the auto-priority factor, the system can include four factors from each offer: Business Priority Factor; Payout Factor; Conversion Element; and Inventory Element. However, the system can employ any number of factors that the user deems appropriate. The business priority can be entered manually or created automatically. This allows the user to influence the priority based upon their business needs. The user may want to establish a good working relationship with a new advertiser, or they may have received complaints about the performance of a certain offer. These considerations are sometimes hard to quantify, but that does not make them any less important to a business. The business priority factor enables the user to account for these concerns without totally abandoning a priority scheme that helps maximize profit. It also helps the user take some effect out of the poor decisions of employees.

The payout factor is based upon how much is paid for the successful conversion of an offer. The payout factor can be based upon the relative payout of that offer when compared to others. Alternatively, the payout factor can be determined any other way that a user will want to measure the income from an offer, relative to other offers or not.

The third factor is the conversion element. This factor allows the user to account for end user choice when viewing the offer. It is sometimes the case where there will be a large payout for a conversion for a product that no one wants. Given the effort to get end users to one's web site or locale and the limited amount of time the end user spends looking at offers, it is important to consider what offers they are likely to accept. This factor combined with the payout factor enables the auto-priority system to make a continuous cost benefit analysis for each offer. This number may be based upon how many times an offer is shown verses successful conversions.

Given end users' behavior, the conversion element must account for the fact that end users abandon sites at a higher rate as they mover deeper into the site. This is the natural behavior of website navigation. End users abandon as they move farther through pages. Therefore, page one gets the most impressions, then page two, and so on. The result is that page one is the most valuable space, then page two, etc. Therefore, the conversion element is best determined by not using a straight line approach. Offers, located on page one, that receive an impression are to be held to higher standard in terms of the conversion rate. The conversion element for offers higher in the order (page one, two etc.) that do not convert will more severely affected in the auto-priority system than if they where much lower in the order (i.e. seventh or eighth offer shown). Conversely, offers that convert well lower in the order deserve to be credited. In essence, the system will determine a weight factor to indicate how, in light of end user behavior, that page fares due to its position and not the offers on it.

Another consideration is the amount of inventory an offer has. As with any business, one would like to move excess inventory. Also, one cannot sale what one does not have. In the present example, another consideration is the satisfaction of the advertisers. When the advertisers supply the user with an inventory for the offer, they expect to have that inventory used. The inventory element in the auto-priority system allows the system to account for an offer's remaining inventory when determining the offer's priority. The user can also have the inventory element, as well as any other factor, capped to prevent over weighting the auto-priority factor in terms of inventory.

The auto-priority system will take all of the factors that the user has deemed appropriate and produce the auto-priority factor. Once the auto-priority factor is created, it will then determine the order in which the offers are to be displayed to an end user.

A sample algorithm for priority is as follows:

$$\text{Priority} = a*b*c*d$$

Wherein:
    a=Business Priority b=Payout Factor
    c=Conversion Element d=Inventory Element The system can also take into account offers with geographic limitations. When the end user inputs their location via zip code or address, the system will then exclude those offers with a higher priority number if the offers are restricted to a geographic location different from that of the end user. The system can also allow the user to increase the priority of the geographical limited offers if an end user were to indicate that they were present within the offer's geographical location.

Another way of presenting offers with geographic limitations is to have the geographic information compared to the database of geographic offers. If there is a positive match, those offers will be included into the offers shown to the end user. The user is free to determine where in the order they want the geographic orders displayed (i.e. always first or always last).

FIG. 19 shows an example of a user interface for the auto-priority system. This user interface allows the user to manually adjust the business priority factor to an appropriate level. While the interface shows that the user will input a number as a factor, it is also contemplated that interface will have a drop down menu for the user to determine the priority. The drop down menu can have options like low, medium and high, very high, etc. Each of these values would have a standard factor associated therewith. This would allow the user to maintain a certain level of continuity between priorities and not skew the auto-priority function.

FIG. 20 shows the rotation order interface. This allows the user to see in what order the offers are being displayed. The user can also create reports based upon geographic locations to see the offer priority in a selected geographic location.

FIG. 21 shows an example of how the end user will view the offers after the landing page, which may or may not require information submission. The figure shows an example of what the offer building system creates. The details of the specific offer are shown on the side. The fields that the advertiser requires are shown in the offer and are to be filled out by the end user. The end user can then fill out the fields and press "submit". They are then taken to the next page. The offer associated with that page, and the pages after that, is determined by the auto-priority system. The user can also decide not to fill out the fields for a particular offer. They will be directed to the next offer as determined by the auto-priority system.

Another way of displaying the offers is to have the offers associated with a set page. Then having the auto-priority system determine the order in which the pages are pushed to the end user.

It is also possible to have the end user directed to another campaign once the end user is finished with all the offers within a previous campaign. Given that there can be any number of campaigns; the priority system can be geared to determine what campaign the end user will be directed after completing a previous campaign. One way to do this is to have other campaigns entered into the auto-priority system, but have priority numbers that are less than of all offers within the campaign. However, the campaigns arrangement (at the bottom of the auto-priority system) can vary among the campaigns, with numbers lower than that of all the offers associated with the first campaign.

However, a user may place other campaigns within the auto-priority system to compete with offers. This will allow the user to maximize profit if a certain campaign will present more profit than the remaining offers for associated with that original campaign.

Numerous modifications and alternative arrangements may be devised by those skilled in the art without departing from the spirit and scope of the present invention, and the present invention is intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. An offer prioritization system comprising:
    an offer module that contains one or more offers for display to an end user;
    an end user input module that allows an end user to input data into the offer prioritization system;
    an information module that contains data associated with the one or more offers;
    an auto-priority module that ranks the one or more offers based upon one or more auto-priority factors; wherein the one or more auto-priority factors is a business priority factor, a payout factor, a conversion element, an inventory element or any combination thereof;
    a decision module that determines displayed offers; wherein the displayed offers comprise the one or more offers that are to be displayed to the end user; the decision module also places the displayed offers in a display order; wherein the display order comprises the order in which the end user is to view the displayed offers; wherein the decision module takes information from the information module, the end user input module and the rank from auto-priority module to determine the displayed offers and the display order;
    wherein the conversion element is based upon the previous number of times an offer has been displayed and the number of successful conversions of that offer, and wherein the conversion element takes into account that offer's positions in one or more previous displays orders, such that a conversion of that offer in a higher position in previous display orders will not receive as much weight in the determination of the conversion element than the conversion of that offer in a lower position in previous display orders; and
    a display module, wherein the display module will present the displayed offers in the display order as decided by the decision module.

2. An offer prioritization system according to claim 1, wherein the end user input module accepts data submitted by the end user.

3. An offer prioritization system according to claim 2, wherein the decision module does not require data from the end user input module to determine the displayed offers and the display order.

4. An offer prioritization system according to claim 2, wherein the data from the end user is name, date of birth, address, zip code, health, telephone number, areas of interest, hobbies, income, risk adverseness, property, information about lineage, progeny, or any combination thereof.

5. An offer prioritization system according to claim 1, wherein the information associated with the offers comprises one or more criteria for the offer, such that the offer is only available for the displayed offers if the data gathered in the end user input module meets said one or more criteria.

6. An offer prioritization system according to claim 5, wherein said one or more criteria comprises geographical location of the end user.

7. An offer prioritization system according to claim 6, wherein the business priority factor is created automatically, created by the user, created automatically but can be edited by a user, or any combination thereof.

8. An offer prioritization system according to claim 6, wherein the payout factor comprises income received by a user for successful conversion of a particular offer.

9. An offer prioritization system according to claim 1, wherein the inventory element comprises the availability of inventory associated with the offer.

10. An offer prioritization system according to claim 9, wherein the inventory element also takes into account a projected surplus of inventory value within a predetermined time period.

11. A method for prioritizing offers according to claim 10, wherein inventory projection system is employed to project the use of inventory during the predetermined time period; wherein the inventory projection system comprises:
   a daily cap element; wherein the daily cap element comprises a limit upon the amount of inventory of an offer that can be expended within a day;
   an allotted time period cap; wherein the allotted time period cap comprises the amount of inventory of a offer that can be expended over the allotted time period
   a days remaining element; wherein the days remaining element comprises of the days remaining within the allotted time period;
   a leads generated element; wherein the leads generated element comprises the number of leads generated by a particular offer;
   an index; wherein the index for an offer comprises of the profit margin element for that offer divided by the average of the profit margin element for all offers;
   wherein the projected surplus inventory value is equal to a actual inventory remaining value if the index is greater than a predetermined value; otherwise the projected inventory remaining value is the product of the actual inventory remaining value and the index; wherein the actual inventory value is equal to the product of the days remaining element and the daily cap element if the product of the days remaining element and the daily cap element is greater than the allotted time period cap minus the leads generated element, otherwise the actual inventory value is equal to the allotted time period cap minus the leads generated element.

12. An offer prioritization system according to claim 1, wherein the auto-priority module assigns all of the one or more offers a rank.

13. An offer prioritization system according to claim 12, wherein the decision module determines the displayed offers after all of the one or more offers is assigned a rank; wherein if the data entered into the end user input module matches criteria of one or more offers, the decision module will include those offers with the matching criteria in the displayed offers.

14. An offer prioritization system according to claim 1, wherein a user is able to input a weighting factor for the one or more auto-priority factors in the auto-priority module.

15. An offer prioritization system according to claim 1, wherein if the data entered into the end user input module matches criteria of one or more offers, the decision module will include those offers with the matching criteria in the displayed offers.

16. An offer prioritization system according to claim 15, wherein only the offers with the matching criteria are included in the auto-priority module.

17. An offer prioritization system according to claim 1, wherein a user is able to disable any offer in the system.

18. An offer prioritization system according to claim 1, wherein the one or more offers comprise graphical user interfaces.

19. An offer prioritization system according to claim 18, wherein the offers presented to the end user require the end user to input information; upon submitting the information, the system will attempt to verify the information;
   if the information is verified, then the display module will move the end user to the next offer;
   if the information is unverified, the display module will keep the end user at the same offer; and
   wherein the display module allows the end user to bypass one or more offers and proceed to the next offer in the display order without passing verification.

20. A method for prioritizing offers comprising:
   storing one or more offers for display to an end user, and storing information associated with the offers;
   ranking the one or more offers based upon one or more auto-priority factors; wherein the auto-priority factors comprise a business priority factor, a payout factor, a conversion element and an inventory element; ranking the one or more offers assigns each offer a rank;
   determining displayed offers and display order; wherein the displayed offers are the offers to be displayed to the end user; and wherein the display order is the order in which the displayed offers are to be shown to the end user; wherein the determining takes the data associated with the offers and the rank to determine what offers are displayed to the end user and in what order;
   wherein the conversion element is based upon the previous number of times the offer is displayed and the number of successful conversions of that offer, and wherein the conversion element takes into account the offer's one or more positions in previous display orders to end users such that a conversion of the offer higher in a previous display order will not receive as much weight in the determination of the conversion element than the conversion of the offer that was lower in a previous display order; and
   displaying the displayed offers in the display order.

21. A method for prioritizing offers according to claim 20, further comprising:
   inputting data by an end user; and wherein the input from the end user is used in the determination of the displayed offers.

22. A method for prioritizing offers according to claim 21, wherein the inputted data by the end user is name, date of birth, address, zip code, telephone number, areas of interest, hobbies, income, risk adverseness, property, income, health, information about lineage and progeny, or any combination thereof.

23. A method for prioritizing offers according to claim 20, wherein the information associated with the one or more offers comprises one or more criteria; and wherein the determination of the displayed offers will take into account if the inputted data from the end user meets said one or more criteria.

24. A method for prioritizing offers according to claim 23, wherein one of said criteria can be geographical location of the end user.

25. A method for prioritizing offers according to claim 20, wherein the business priority factor is created automatically, created by a user and can be edited by the user, created automatically and can be edited by a user, or any combination thereof.

26. A method for prioritizing offers according to claim 20, wherein the payout factor is based upon income received by a user for successful conversion of a particular offer.

27. A method for prioritizing offers according to claim 20, wherein the inventory element at least partially derived from the availability inventory associated with a particular offer.

28. A method for prioritizing offers according to claim 27, wherein the inventory element is further derived from a projected surplus of inventory value from an inventory projection system as defined within a predetermined time period.

29. A method for prioritizing offers according to claim 28, wherein inventory projection system is employed to project the use of inventory during the predetermined time period; wherein the inventory projection system comprises:
 a daily cap element; wherein the daily cap element comprises a limit upon the amount of inventory of an offer that can be expended within a day;
 an allotted time period cap; wherein the allotted time period cap comprises the amount of inventory of a offer that can be expended over the allotted time period
 a days remaining element; wherein the days remaining element comprises of the days remaining within the allotted time period;
 a leads generated element; wherein the leads generated element comprises the number of leads generated by a particular offer;
 an index; wherein the index for an offer comprises of the profit margin element for that offer divided by the average of the profit margin element for all offers;
 wherein the projected surplus inventory value is equal to a actual inventory remaining value if the index is greater than a predetermined value; otherwise the projected inventory remaining value is the product of the actual inventory remaining value and the index; wherein the actual inventory value is equal to the product of the days remaining element and the daily cap element if the product of the days remaining element and the daily cap element is greater than the allotted time period cap minus the leads generated element, otherwise the actual inventory value is equal to the allotted time period cap minus the leads generated element.

30. A method for prioritizing offers according to claim 20, wherein the ranking assigns each offer a rank.

31. A method for prioritizing offers according to claim 20, wherein a user is able to enter a weighting factor for one or more of the one or more auto-priority factors.

32. A method for prioritizing offers according to claim 20, wherein if the inputted data by the end user matches criteria of one or more offers, the displayed offers will match the one or more offers with the matching criteria.

33. A method for prioritizing offers according to claim 32, wherein only the one or more offers with the matching criteria will be considered when ranking.

34. A method for prioritizing offers according to claim 32, wherein all offers are ranked, and if the inputted data by the end user does fails to meet the one or more criteria of one or more offers, those offers will be disregarded when determining the displayed offers, the display order will be determined by the rank of the displayed offers.

35. A method for prioritizing offers according to claim 20, further comprising disabling any offer in the system if a user so desires.

36. A method for prioritizing offers according to claim 20, wherein the displayed offers comprise of graphical user interfaces, and wherein the end user is sent along an established path of locations, but wherein the offers displayed on each of those locations for an end user comprises of the displayed offers in the display order.

37. A method for prioritizing offers according to claim 20, wherein the one or more offers are graphical user interfaces, and wherein the end user is directed to the location of each of the offers in the displayed offers.

38. A method for prioritizing offers according to claim 20, further comprising verification of the data inputted by the end user upon submitting the information;
 if the information is verified, then the display module will move the end user to the next offer;
 if the information is unverified, the display module will keep the end user at the same offer; and
 wherein the display module allows the user to bypass one or more offers and proceed to the next offer in the display order without passing verification.

39. A system for the for managing the offers presented to end users comprising:
 an offer prioritization module and an inventory management module;
 one or more databases that contain one or more offers for display to an end user and wherein information associated with the one or more offers is contained in the one or more databases;
 a graphical user interface that will allow a user to input and retrieve the information in the one or more databases;
 wherein the information comprises:
  the inventory associated with the one or more offers;
  one or more campaigns for which the inventory of offers will be presented to end users;
  a price point for the one or more offers;
  one or more limits;
  one or more rules; wherein when one or more of the limits are triggered, the inventory management system will alter the availability of the offers that had a limit triggered in adherence with one or more rules associated with the one or more limits being triggered;
 wherein the inventory management module manages the inventory of the offers based upon the information; wherein management comprises the determination of whether offers are available to for use in the offer prioritization module;
 wherein the offer prioritization module comprises:
 an end user input module that allows the end user to input data into the one or more databases;
 an auto-priority module that ranks the one or more offers based upon one or more auto-priority factors; wherein the auto-priority factors comprise a business priority factor, a payout factor, a conversion element and an inventory element;
 a decision module that determines displayed offers; wherein the displayed offers comprise the one or more offers that are to be displayed to the end user; the decision module also places the displayed offers in a display order; wherein the decision module takes information from the one or more databases, end user input module and the rank from auto-priority module to determine the display offers and the display order;
 wherein the conversion element is based upon the previous number of times an offer is displayed and the number of successful conversions of that offer; wherein the conversion element also takes into account the offer's one or more positions in previous displays orders such that a conversion of the offer higher in a previous display order will not receive as much weight in the determination of the conversion element than the conversion of the offer that was lower in a previous display order;

a display module, wherein the display module will present the displayed offers to the end user in the display order; and wherein once one of the displayed offers is presented to the end user, accepted by the end user and a successful conversion has occurred, the information on the one or more databases is updated to reflect the change to the inventory associated with that offer and to reflect the conversation.

40. A method for managing and the presentation of offers to end users comprising:

storing one or more offers for display to an end user; also storing information associated with the one or more offers; wherein the one or more offers and the information associated with the one or more offers is stored in the one or more databases;

inputting the information from the one or more databases;

retrieving the information from the one or more databases;

wherein the information comprises:

the inventory associated with the offers;

one or more campaigns for which the inventory of offers will be presented to end users;

a price point for the offers;

one or more limits;

one or more rules; wherein when one or more of the limits are triggered, the inventory management system will alter the availability of offer in adherence with one or more rules associated with the one or more limits being triggered;

managing the inventory of the offers based upon the information; wherein management comprises the determination of whether offers are available to for use in determining offer prioritization;

wherein the determination of offer prioritization comprises:

accepting an end user input data into the one or more databases;

ranking the one or more offers based upon one or more auto-priority factors; wherein the auto-priority factors comprise a business priority factor, a payout factor, a conversion element and an inventory element;

determining the display offers and a display order; wherein the display offers comprise of the one or more offers determined to be displayed to the end user; wherein the display order comprises the order in which the displayed offers are to be displayed to the end user; wherein the determining the display offers and the display order is derived from the information from one or more databases, end user input and the rank;

wherein the conversion element is based upon the previous number of times an offer is displayed and the number of successful conversions of that offer; wherein the conversion element takes into account the offer's one or more positions in previous display orders such that a conversion of the offer in a higher position in a previous display order will not receive as much weight in the determination of the conversion element than the conversion of the offer that was in a lower position in a previous display order;

displaying the displayed offers in the display order; and updating the information; wherein once an offer is presented to the end user and properly accepted by the end user, the information on the one or more databases is updated to reflect the change to the inventory associated with that offer and to reflect the successful conversion associated with of that offer.

41. An inventory management system for managing inventory of product offers comprising:

one or more databases a graphical user interface that will allow a user to input and retrieve information about the inventory of offers;

wherein the information comprises the inventory associated with the offers;

one or more campaigns for which the inventory of offers will be presented to end users;

a price point for the offers;

one or more limits;

one or more rules; wherein when one or more of the limits are triggered, the inventory management system will alter the availability of offer in adherence with one or more rules associated with the one or more limits being triggered; and wherein the inventory management system manages the inventory of the offers based upon the information; wherein management comprises the determination of whether offers are available to end users.

42. An inventory management system according to claim 41, wherein the one or more limits comprise a cap on the depletion of inventory over one or more specified time periods and wherein the rule associated with the cap is the termination of the availability of the offer.

43. An inventory management system according to claim 42, wherein the one or more specified time periods are one day, one month, or both, one day and one month.

44. An inventory management system according to claim 41, wherein when the information is entered or edited, the one or more databases will be contemporaneously updated.

45. An inventory management system according to claim 41, wherein the one or more databases is used by one or more systems.

46. An inventory management system according to claim 45, wherein the one or more systems is the inventory management system, an offer auto-priority system, an inventory projection system, an offer build system, or any combination thereof.

47. An inventory management system according to claim 41, wherein the one or more limits further comprises an ability to disable any of the one or more offers associated with the inventory.

48. An inventory management system according to claim 47, wherein the ability to disable any of the one or more offers comprises the ability to make the offers unavailable for one or more campaigns while leaving the offers available for other campaigns.

49. An inventory management system according to claim 47, wherein the ability to disable the one or more offers comprises the ability to make the offers unavailable for one or more geographic areas while leaving the offers available for other geographic areas.

50. An inventory management system according to claim 41, wherein the one or more limits are a predetermined number of failures of conversion attempts in sequential order, a percentage of failures over a predetermined number of conversion attempts, a predetermined number of conversions emanating from a third party, or any combination thereof.

51. An inventory management system according to claim 41, wherein the user is able to disable the offers from all campaigns and prevent the selected offers from being displayed to the end user.

52. An inventory management system according to claim 41, wherein the user is able to assign a start time and an end time in which the inventory is available for disbursement.

53. An inventory management system according to claim 41, wherein the system will allow one or more clients of the user to access to the system to make changes to inventory, price point, the limit for depletion of the inventory, the specified time period or any combination thereof; wherein the ability of the one or more clients to enter the system and make changes is determined by the user.

54. An inventory management system according to claim 41, wherein the one or more limits comprises a predetermined number of conversions emanating from a third party.

55. An inventory management system according to claim 41, wherein the one or more limits comprise a cap on the use of inventory for a specific location; and wherein the rule associated with the cap on the use of inventory for a specific location will prevent the one or more offers from being displayed to end users that meet requirements for the specific location once the cap on the use of inventory for a specific location has been triggered; however the rule associated with the cap on the use of inventory for a specific location will allow the one or more offers to be displayed to end users that do not meet the requirements for the specific location.

56. An inventory management system according to claim 55, wherein the specific location is a campus, a branch, a franchise location, a retail store, or any combination thereof.

57. An inventory management system according to claim 55, wherein the requirements for the specific location is a zip code, city, area code, county, state, country, end user selection, end user input or any combination thereof.

58. A method for performing management of inventory comprising:
  obtaining information concerning the inventory of offers from one or more sources; wherein the information comprises:
    the inventory associated with the offers;
    one or more campaigns for which the inventory of offers will be presented to end users;
    a price point for the offers;
    one or more limits;
    one or more rules; wherein when one or more of the limits are triggered, the inventory management system will alter the availability of offer in adherence with one or more rules associated with the one or more limits being triggered;
  comparing and sorting the information according to an algorithm; wherein the algorithm utilizes the information;
  selecting displayable information that has been sorted according to the algorithm;
  displaying the selected displayable information to the end user; and
  managing the inventory based upon the information and the data provided by the end user.

59. A method for performing management of inventory according to claim 58, wherein the one or more limits comprise a cap on the depletion of inventory over one or more specified time periods and wherein the rule associated with the cap on the depletion inventory is the altering the availability of the offer.

60. A method for performing management of inventory according to claim 59, wherein the one or more specified time periods is one day, one month, or both one day and one month.

61. A method for performing management of inventory according to claim 58, further comprising:
  altering the availability of inventory based upon the triggering of the one or more limits; wherein the altering the availability of inventory will be accounted for by the algorithm.

62. A method for performing management of inventory according to claim 61, wherein the ability to alter the availability of inventory comprises an ability to make the offer unavailable for one or more campaigns while leaving the offer available for other campaigns.

63. A method for performing management of inventory according to claim 61, wherein the ability to alter the availability of inventory comprises an ability to make the offer unavailable for one or more geographic areas while leaving the offer available for other geographic areas.

64. A method for performing management of inventory according to claim 58 wherein the one or more limits are a predetermined number of failures of conversion attempts in sequential order, a percentage of failures over a predetermined number of conversion attempts, a predetermined number of conversions emanating from a third party, or any combination thereof.

65. A method for performing management of inventory according to claim 58, wherein the information includes whether or not the inventory for an offer has been made available by a user.

66. A method for performing management of inventory according to claim 58, wherein the information includes a time period in which the offer inventory is available for disbursement.

67. A method for performing management of inventory according to claim 58, wherein a user is able to alter the algorithm to vary the sorting of the information.

68. A method for performing management of inventory according to claim 58, wherein the one or more limits comprise a cap on the use of inventory for a specific location; and wherein the rule associated with the cap on the use of inventory for a specific location will prevent the one or more offers from being displayed to end users that meet requirements for the specific location once the cap on the use of inventory for a specific location has been triggered; however the rule associated with the cap on the use of inventory for a specific location will allow the one or more offers to be displayed to end users that do not meet the requirements for the specific location.

69. A method for performing management of inventory according to claim 68, wherein the specific location is a campus, branch, a franchise location, a retail location or any combination thereof.

70. A method for performing management of inventory according to claim 68, wherein the requirements for the specific location is a zip code, city, area code, county, state, country, end user selection, end user input or any combination thereof.

* * * * *